Patented Oct. 28, 1952

2,615,900

UNITED STATES PATENT OFFICE 2,615,900

PROCESS AND CATALYST FOR PRODUCING ETHYLENE OXIDE

George W. Sears, Jr., Wilmington, Del., assignor to E. I. du Pont de Nemours & Company, Wilmington, Del., a corporation of Delaware No Drawing. Application June 23, 1949, Serial No. 100,983

4 Claims. (Cl. 260—348.5)

This invention relates to silver catalyst compositions and methods for the oxidation of ethylene to ethylene oxide. More particularly it is directed to catalyst compositions adapted for the oxidation of ethylene to ethylene oxide which comprise a silver catalyst, a metal halide other than a fluoride which is a stable solid at temperatures up to 400 C., the metal halide being present in a minor amount based upon the weight of metallic silver in the catalyst composition, and a particulate solid extender for the silver catalyst.

It has long been known that ethylene is readily oxidized by passing it in mixture with oxygen into contact with a catalyst composition containing a silver catalyst; and also that under suitable conditions, one of the oxidation products obtained is ethylene oxide. However, a reaction seriously completing with that of the oxidation of ethylene to give ethylene oxide is the reaction involving the complete oxidation of ethylene to give carbon dioxide and water.

Ordinarily the complete oxidation reaction predominates, thus making the process undesirable from two points of view: First the yield of ethylene oxide is poor and second the competing complete oxidation reaction makes it difficult to control the temperature in the catalyst composition and avoid overheating, since about ten times as much heat is developed in the oxidation of ethylene to carbon dioxide as in the oxidation of ethylene to ethylene oxide.

In order to suppress the reaction involving the complete oxidation of ethylene and make it possible to control the operating conditions more readily so as to obtain increased yields of ethylene oxide, it has previously been suggested to add various depressant or anticatalytic fluids to the ethylene-oxygen containing gases which are to be contacted with the silver catalyst.

It has been suggested that the depressant or anticatalytic materials be added to the feed gases in the form of a fluid; that is either as a gas, or a liquid, or in dissolved form. The addition is made continuously or at least at frequent intervals and in carefully controlled amounts. Among the fluids which have been suggested are gases such as steam, carbon dioxide, nitrogen, ammonia, and other volatile bases, and hydrogen sulfide; also a variety of low boiling organic compounds or organic compounds having appreciable volatility such as benzene, xylene, ethyl alcohol, aniline, tetraethyl lead, ethylene dichloride, carbon tetrachloride, hexane, and diphenylamine.

It is an object of this invention to provide catalyst compositions for use in processes whereby ethylene may easily and economically be converted to ethylene oxide by oxidation in contact with a silver catalyst without resorting to the introduction of fluid retardants or anticatalysts to suppress complete oxidation of the ethylene. It is a further object of the invention to avoid the added expense and operational complications which attend the prior art processes in the continuous or frequently intermittent addition of carefully controlled amounts of gases, liquids, or solutions in processes for the oxidation of ethylene using a catalyst composition containing a silver catalyst. Further objects will become apparent hereinafter.

The foregoing and other objects of the invention are attained by passing a mixture of ethylene and oxygen at a reactive temperature, ordinarily in the range of 150° C. to 400° C., into contact with a catalyst composition which contains an active silver catalyst, a metal halide other than a fluoride which is a stable solid at temperatures up to 400° C., the metal halide being present in a minor amount based upon the weight of metallic silver in the catalyst composition, and a particulate solid extender for the silver catalyst.

The expression "catalyst composition" is used herein to designate the total solid mixture comprising a silver catalyst, a carrier, and/or other added solids with which the ethylene-oxygen mixture is contcated to effect the oxidation reaction. The term includes such solid mixture in any suitable degree of subdivision and whether present as a fixed bed or suspended in the stream of reacting gases as in the case of a boiling bed or a fluid-flow type operation.

"Silver catalyst" as used herein means the metallic silver-containing particles of the catalyst composition as distinguished from discrete particles of carrier and other added solids which constitute part of the catalyst composition.

The term "extender" is used to designate the solid, usually in a particulate or pulverulent form, which serves as a diluent or as a support for the silver catalyst. Many materials are known or suggested for use as extenders for silver catalyst in ethylene oxidation processes, for example; alumina, corundum, alundum, firebrick, double silicates such as the zeolites illustrated in U. S. 1,694,122, or double silicates such as aluminum silicates like analcite, natrolite, and nephelite, diatomaceous earth, crushed firebrick, fuller's earth, pumice, silicon carbide, and various selected clays.

In preferred compositions of the present invention, there is employed in addition to the silver catalyst and the metal halide an extender which comprises granular artificial graphite as a diluent and as a support porous, siliceous, predominantly spherical granules of aggregated calcined particles of finely powdered diatomaceous earth, said particles being bound together in aggregate granules by a silicate formed in situ and said granules having a bulk density of about 25 to 55 pounds per cubic foot at a particle size in the range of 60 to 200 mesh. It is preferred to use granular artificial graphite in amount from 25% to 75% by volume based upon the total volume of the catalyst composition. The granular artificial graphite feature is set out in more detail and is claimed in my copending application, Serial No. 100,982, filed of even date herewith; also the employment of a silver catalyst extender or support consisting of porous, siliceous, predominantly spherical granules of aggregated calcined particles of finely powdered diatomaceous earth having the properties mentioned above is more fully described and is claimed in coassigned application, Serial No. 100,970, filed of even date herewith.

The silver catalyst for use in the catalyst compositions of the invention may be prepared in any of the manners previously employed for the preparation of silver catalyst, such as by the thermal or chemical reduction of silver compounds such as silver oxide, silver carbonate, or suitable organic silver compounds. The activity of the silver may be enhanced by inclusion in the silver catalyst of promoters such as iron, nickel, copper, gold, platinum, manganese, cobalt, cerium, thorium, zinc, and the oxides, hydroxides, and carbonates of alkali metal and alkaline earth metals.

Preferably the silver catalyst of the catalyst compositions of the invention comprises a mixture of silver and beryllium oxide which is obtained by coprecipitating a reducible oxygen-containing compound of silver and a corresponding compound of beryllium in a silver-beryllium weight ratio of from 10:1 to 5000:1 from a solution of a silver compound and a beryllium compound and reducing the coprecipitate to a mixture of metallic silver and beryllium oxide. The coprecipitated beryllium oxide-containing silver catalyst is more fully described and is claimed in my copending application, Serial No. 100,981, filed of even date herewith.

As mentioned previously, the catalyst compositions of the present invention are particularly characterized by containing a minor amount of at least one member of a group of specified metal halides. Metal halides which are suitable are the metal chlorides, bromides, or iodides which are stable solids at temperatures up to 400° C., in other words, those metal halides, excepting fluorides, which do not melt or thermally decompose at temperatures of 400° C. or below.

Particularly preferred metal halides for use in the catalyst compositions of the invention are those of the metals of the first and second groups of the periodic table which are stable solids up to 400° C., such as, for example, the chlorides, bromides, or iodides of lithium, sodium, potassium, copper (ic or ous), silver, cesium, beryllium, magnesium, calcium, strontium, cadmium and barium. Rare earth metal halides such as cerium chloride, lanthanum chloride, samaric chloride, and samarous chloride may also be used. Still other metal halides which are suitable include materials such as ferrous chloride, lead chloride, manganese dichloride, palladium monochloride, platinum dichloride, thallium monochloride, thallium monobromide, thorium chloride, titanium dibromide, titanium trichloride, and zinc iodide. For practical reasons the use of metal chlorides is preferred over the use of bromides or iodides.

The metal halide may be incorporated into the catalyst composition by simple admixture of particulate or pulverulent solid metal halide with the remainder of the divided catalyst composition, thus giving a catalyst composition which contains discrete particles of the solid metal halide. Other convenient methods may also be used; for example, a porous or adsorbent extender material such as the aforementioned porous, siliceous, predominantly spherical granules of aggregated calcined particles of finely powdered diatomaceous earth may be steeped in a solution of the metal halide, then dried, and admixed in the catalyst composition. In the later case the solid metal halide is then present in the catalyst composition in a finely dispersed form, in and on some or all of the extender material employed in the catalyst composition.

Ordinarily the metal halide is present in the catalyst composition in an amount which is minor compared to the weight of metallic silver. The metal halides can be used with safety over a relatively wide concentration range. The maximum permissible concentration of metal halide cannot be stated with precision because it will vary with the particular metal halide used, with the form in which the halide is present in the catalyst composition, that is whether it is present as discrete particles or crystals or dispersed in and on a porous or adsorbent extender, and with the activity of the silver catalyst; and the latter, of course, may vary considerably depending upon its method of preparation. Process variables such as temperature, space velocity and gas concentrations also have some bearing upon the maximum amount of metal halide which can be safely used.

It can be said, however, that if the catalyst is of relatively low activity then either lesser amounts of the metal halide or one of the less active metal halides should be used. Also smaller amounts of a given metal halide are required as the particle size of the halide is decreased. In general the metal halide will be present upon a weight basis in amount not exceeding about one half the weight of the metallic silver in the catalyst composition and more particularly will be in the range of 0.01% to 50% by weight based upon the weight of the metallic silver.

Certain of the suitable metal halides such as sodium chloride, silver chloride, and potassium chloride have what may be called a moderate, persistent, uniform action. Once included in the catalyst composition, they exert their desirable action in a uniform manner over long periods of time, sometimes for the entire life of the catalyst itself. Other of the metal halides, such as cupric chloride, lithium chloride, and beryllium chloride have a relatively high initial activity but the activity falls off rapidly so that these latter materials do not maintain a uniform performance level.

Mixtures of the individual metal halides may be used to advantage in order to utilize the various properties mentioned above. For example, it may be desirable to have present a metal halide having a high initial activity during the "breaking in" period of a new catalyst composition, but on the other hand, a metal halide having a relatively moderate but steady activity over long periods of time is wanted for continued, normal operation. Thus, the inclusion in a freshly prepared catalyst composition of a mixture of one or more of the moderately active, long-life, metal halides such as sodium chloride or silver chloride and one or more of the short-lived, high-initial activity, metal halides such as the lithium, beryllium or copper chlorides is preferred.

Keeping in mind the aforementioned variations in the behavior of the various suitable solid metal halides and having reference to the specific examples which follow, one will readily be able to determine by a few simple trials the amount of the metal halide or mixture of metal halides required to give the desired control of the reaction with a particular catalyst composition under any given set of desired operating conditions.

*Example I*

745 grams of silver nitrate and 24.6 grams of beryllium nitrate-trihydrate (Ag:Be weight ratio=400:1) are dissolved in 7500 ml. of distilled water. While stirring the solution vigorously, 175 grams of sodium hydroxide in 1700 ml. of distilled water are rapidly added. Stirring is continued for 10 minutes then the precipitate is allowed to settle for about one hour. The supernatant liquid is decanted and the precipitate washed with distilled water by stirring, settling and decanting until the wash water is nitrate-free.

The mixed oxides are then separated by filtration and washed several times with acetone to remove essentially all the water. The coprecipitate is then dried at 60–70° C.

The dried silver oxide-beryllia coprecipitate is sieved through a 35 mesh screen and is mixed with 1200 ml. porous, siliceous, predominantly spherical granules of aggregated calcined particles of finely powdered diatomaceous earth, the particles being bound together in aggregate granules by a silicate formed in situ and said product having a bulk density of about 28 pounds per cubic foot and having a particle size in the range of 80 to 200 mesh. In other words, the calcined diatomaceous earth is screened and the material used is that which passes thru 80 mesh but is retained on 200 mesh screen.

Acetone is added to the mixture of calcined diatomaceous earth and the silver oxide-beryllia coprecipitate to wet the mixture completely and form a slurry. The slurry is stirred at room temperature until the acetone has evaporated sufficiently to form a free-flowing powder. The product, still containing appreciable amounts of acetone, is charged into a glass reactor. A slow stream of dry air is passed thru the reactor at room temperature until the odor of acetone is no longer detectable and then 2% ethylene in nitrogen is passed thru the reactor while heating the contents to 175–185° C. whereby the silver oxide in the silver oxide-beryllia coprecipitate is reduced to metallic silver. The reduction requires 2 to 4 hours.

The silver-beryllia coprecipitate supported on the calcined diatomaceous earth extender is admixed with 2300 ml. of granular (thru 80 on 200 mesh) artificial graphite. To this mixture there is added 5 grams of a cupric chloride impregnated calcined diatomaceous earth containing 10% cupric chloride by weight. There is also added 300 grams of a sodium chloride impregnated calcined diatomaceous earth containing 20% sodium chloride by weight.

The metal halide impregnated diatomaceous earths employed in the catalyst composition of this example are obtained by steeping a calcined diatomaceous earth (thru 48 on 80 mesh) in a solution of the metal halide. The mixture is then stirred while heating to evaporate water until the product is free-flowing. It is then heated in an oven to 125–150° C. and then air elutriated at a linear gas velocity of 0.5–1.0 feet per second at 250° C. for about one hour.

The catalyst composition of the example after being thoroughly mixed is placed in a reactor and suspended in a stream of 10% ethylene in air at a temperature of 240° C. The linear gas velocity based on the empty reactor at operating temperatures is about 0.5 ft. per second. 40–45% of the ethylene fed reacts, 65% of the reacted ethylene forming ethylene oxide.

In contrast with the foregoing results, a catalyst composition prepared similarly but omitting the metal halides gives only a 25% reaction of the ethylene and only 55% of the reacted ethylene forms ethylene oxide at substantially the same operating conditions described above.

*Example II*

A composition is prepared according to the procedure detailed in Example I except that the cuprous chloride and sodium chloride are added as crystalline materials instead of dispersing them on the surfaces and in the pores of calcined diatomaceous earth. Thus according to the present example, 30 grams of crystalline cuprous chloride and 1800 grams of crystalline sodium chloride are incorporated in the catalyst composition. The product so obtained gives ethylene oxidation results which are substantially equivalent to those obtained using the composition of Example I.

It should be noted that if the metal halides are incorporated as discrete crystalline particles instead of being dispersed on a porous adsorbent extender considerably larger amounts are required, generally 20 to 40 times as large a concentration to produce an equivalent effect.

*Example III*

A catalyst composition is prepared according to the process of Example I except that calcium chloride is used instead of sodium chloride. Using this catalyst composition at the operating conditions described in Example I, 41% of the ethylene fed reacts, 66% of the reacted ethylene forming ethylene oxide.

*Example IV*

A catalyst composition is prepared according to the process of Example I but substituting silver chloride for sodium chloride. The preparation of the silver chloride impregnated calcined diatomaceous earth is accomplished by impregnating the calcined diatomaceous earth with silver nitrate followed by boiling in HCl vapors at 85° C. and then air drying at 250° C. Using this catalyst at the operating conditions of Example I, 45% of the ethylene fed reacts and 65% of the reacted ethylene forms ethylene oxide.

*Example V*

In the catalyst composition of Example I, lithium chloride is substituted for sodium chloride, the amount of lithium chloride used being only 10% of the weight of sodium chloride used in Example I, in other words, 30 grams of 20% lithium chloride in diatomaceous earth. Employing this catalyst, 37% of the ethylene reacts, 68% of the reacted material going to ethylene oxide.

*Example VI*

In the composition of Example I, beryllium chloride is substituted for sodium chloride using 20 grams of 10% beryllium chloride in diatomaceous earth. The resulting catalyst composition employed under the operating conditions of Example I causes 47% of the ethylene fed to react, 62% of the reacted ethylene forming ethylene oxide.

I claim:

1. A catalyst composition adapted for the oxidation of ethylene to ethylene oxide consisting essentially of metallic silver as an essential catalytic agent, a support for said silver, a metal halide other than a fluoride which is a stable solid at temperatures up to 400° C., the metal halide being present on a weight basis in amount not exceeding about ½ the weight of the metallic silver in the catalyst composition, from 25% to 75% by volume based upon the total volume of the catalyst composition of granular artificial graphite, the silver being in mixture with beryllium oxide which mixture is obtained by coprecipitating a reducible oxygen-containing compound of silver and a corresponding compound of beryllium in a silver:beryllium weight ratio of 10:1 to 5000:1 from a solution of a silver compound and a beryllium compound and reducing the coprecipitate to a mixture of metallic silver and beryllium oxide.

2. A catalyst composition adapted for the oxidation of ethylene to ethylene oxide consisting essentially of metallic silver as an essential catalytic agent, a support for said silver, a metal halide other than a fluoride which is a stable solid at temperatures up to 400° C., the metal halide being present on a weight basis in amount not exceeding about ½ the weight of the metallic silver in the catalyst composition, and from 25% to 75% by volume based upon the total volume of the catalyst composition of granular artificial graphite.

3. A catalyst composition adapted for the oxidation of ethylene to ethylene oxide consisting essentially of from 30 to 500 grams of metallic silver per liter of total catalyst composition, a metal halide other than a fluoride which is a stable solid at temperatures up to 400° C., the metal halide being present on a weight basis in amount not exceeding about ½ the weight of the metallic silver in the catalyst composition, from 25% to 75% by volume based upon the total volume of the catalyst composition of granular artificial graphite, and a support for the silver, said silver being in mixture with beryllium oxide which mixture is obtained by coprecipitating a reducible oxygen-containing compound of silver and corresponding compound of beryllium in a silver:beryllium weight ratio of from 10:1 to 5000:1 from a solution of a silver compound and a beryllium compound and reducing the coprecipitate to a mixture of metallic silver and beryllium oxide, and said support for the silver catalyst consisting of porous, siliceous, predominantly spherical granules of aggregated calcined particles of finely powdered diatomaceous earth, said particles being bound together in aggregate granules by a silicate formed in situ and said granules having a bulk density of 25 to 55 pounds per cubic foot at a particle size in the range of 60 to 200 mesh.

4. A catalytic process for making ethylene oxide by the oxidation of ethylene which comprises contacting a stream of ethylene and an oxygen-containing gas at a temperature of 150° C. to 400° C. with a catalyst composition consisting essentially of metallic silver as an essential catalytic agent, a support for said silver, a metal halide other than a fluoride which is a stable solid at temperatures up to 400° C., the metal halide being present on a weight basis in amount not exceeding about ½ the weight of metallic silver in the catalyst composition, and from 25% to 75% by volume based upon the total volume of the catalyst composition of artificial graphite.

GEORGE W. SEARS, Jr.

REFERENCES CITED

The following references are of record in the file of this patent:

UNITED STATES PATENTS

| Number | Name | Date |
|---|---|---|
| 2,006,787 | Berl | July 2, 1935 |
| 2,219,575 | McNamee | Oct. 29, 1940 |
| 2,404,438 | Evans | July 23, 1946 |
| 2,424,083 | Finch et al. | July 15, 1947 |
| 2,424,084 | Finch et al. | July 15, 1947 |
| 2,463,228 | West et al. | Mar. 1, 1949 |